United States Patent [19]
Beutin et al.

[11] Patent Number: 5,740,674
[45] Date of Patent: Apr. 21, 1998

[54] ARRANGEMENT OF GAS TURBINE ENGINE COMPRISING AERODYNAMIC VANES AND STRUTS LOCATED IN THE SAME PLANE AND AN INTERMEDIATE CASING

[75] Inventors: Bruno Beutin, Corbeil Essonnes; Jean-Louis Charbonnel, Boissise Le Roi; André Collot, Mennecy; Claude Dejaune, Boissise la Bertrand; Alain Espenel, Vert Saint Denis; Philippe Fessou, Melun; Jean-Claude Gregoire, Echarcon; Daniel Martin, Bombon; Hervé Paitre, Combs la Ville; Jean-Francois Ranvier, Ponthierry; Monique Thore, Crosne, all of France

[73] Assignee: Societe Nationale d'Etude Et de Construction de Moteurs d'Aviation "Sherma", Paris, France

[21] Appl. No.: 698,064

[22] Filed: Aug. 15, 1996

[30] Foreign Application Priority Data

Aug. 30, 1995 [FR] France .................... 95 10199

[51] Int. Cl.$^6$ .......................................... F02C 7/00
[52] U.S. Cl. .................... 60/226.1; 60/39.31; 60/262; 415/142
[58] Field of Search .............................. 60/39.31, 226.1, 60/226.3, 224, 262; 415/142

[56] References Cited

U.S. PATENT DOCUMENTS

| | | | |
|---|---|---|---|
| 3,830,058 | 8/1974 | Ainsworth | 60/226.1 |
| 4,461,145 | 7/1984 | Stephens. | |
| 4,785,625 | 11/1988 | Stryker et al. | 60/226.1 |
| 4,791,783 | 12/1988 | Neitzel | 60/226.3 |
| 5,123,242 | 6/1992 | Miller | 60/226.1 |
| 5,284,011 | 2/1994 | Von Benken | 60/39.31 |

FOREIGN PATENT DOCUMENTS

| | | |
|---|---|---|
| 0 298 898 | 1/1987 | European Pat. Off. . |
| 2 004 329 | 3/1979 | United Kingdom . |
| 1 557 096 | 12/1979 | United Kingdom . |
| 2 121 115 | 12/1983 | United Kingdom . |
| 2 207 707 | 2/1989 | United Kingdom . |
| 2 226 600 | 7/1990 | United Kingdom . |

*Primary Examiner*—Timothy Thorpe
*Assistant Examiner*—Ted Kim
*Attorney, Agent, or Firm*—Oblon, Spivak, McClelland, Maier & Neustadt, P.C.

[57] ABSTRACT

The arrangement of a gas turbine engine suitable for high bypass ratio aircraft engines in which gases circulate in a primary air channel (7) and a secondary channel (8) concentric to said primary air channel, is characterized in that structural vanes (22) connecting the channel delimitation casings (2, 10, 14, 5) with each other, alternate with aerodynamic vanes (20) for guiding the gases on a common circumference of the engine bypass air channel (8), and in that the structural channels branch out between the two channels. The resulting advantages are simplicity of construction associated with a reduction in the space required for housing the channels and good resistance without notable increase of the total mass.

21 Claims, 3 Drawing Sheets

ARRANGEMENT OF GAS TURBINE ENGINE COMPRISING AERODYNAMIC VANES AND STRUTS LOCATED IN THE SAME PLANE AND AN INTERMEDIATE CASING

DESCRIPTION

The invention relates to a gas turbine machine arrangement comprising cascade vanes and an intermediate casing.

It may be used in the construction of certain modern high bypass ratio aircraft engines, and more specifically in that part of the engine which is situated behind an intake fan. The essential components to be considered here are an outer casing, an inner casing and an intermediate casing which is concentric to the first two casings and divides the gap between them into an inner primary air channel for the compression and then the release of the propulsion gases and a secondary channel in which the engine bypass air circulates.

It is advisable to guide these bypass gases by so-called aerodynamic vanes and to support the casings by connecting them through radial arms which generally take the form of supplementary vanes, known as structural vanes in order to distinguish them from the previously mentioned aerodynamic vanes. Although the structural vanes are similar in aspect to the aerodynamic vanes, they must be sufficiently resistant to provide this support and not to break or buckle in the event of a far vane coming loose and colliding with them. The aerodynamic vanes may be much lighter but must exist in sufficient number to guide the air suitably.

In a traditional engine design, the structural vanes form a group distinct from the aerodynamic vanes and are placed downstream from said aerodynamic vanes in the direction of flow of the bypass air. However, this kind of engine design has latterly been discarded precisely because of the amount of axial space taken up by the vanes. In a more recent design, it was decided to make all the vanes fulfill the same roles; in other words, the vanes were required at one and the same time to be structural and aerodynamic while being arranged in a single circular cascade. But this design resulted in certain disadvantages which offset the advantages obtained in terms of simplicity of structure and reduced space: since all the vanes are exposed to mechanical stress and must therefore have a sufficient cross section, they must to all intents and purposes be of hollow construction and make use of a resistant metal such as titanium so as to guard against an excessive increase in the volume of the casing. In addition, the assembly of the vanes, carried out by machine welding, is a somewhat lengthy process. Moreover, it is observed that hollow vanes present fairly weak resistance to buckling. A similar example is given in document EP-A-0 298 898, in which structural vanes in equal number and in prolongation are laid out in the two channels, but without joining and forming a single group of vanes since the annular intermediate structure between the two channels is very rigid and ensures on its own the cohesion of the structure. This intermediate structure must in all probability be very ponderous.

The invention aims essentially at providing a compact construction for this part of the engine without giving rise to the disadvantages of increased mass and poor solidity characterizing the known solution mentioned above. To give a very brief summary of the conception lying behind the invention, all the vanes are still arranged on the same section of the engine, but the structural and aerodynamic vanes are constructed in a different way and are alternated by groups around this section. The structural vanes are far fewer in number and do not impair the resistance of the whole. On the contrary, it is legitimate to expect a certain improvement due to the possibility of concentrating a greater part of the total mass of the vanes and, in particular, of constructing them with a solid cross-section, whereas the aerodynamic vanes may be hollow, in lighter and less costly material, without the need to assemble them rigidly to the casings by their opposite extremities. Documents GB-A-1 557 096 and GB-A-2 207 707 also describe guide vanes and structural vanes which alternate by groups on a circumference of a channel through which gases pass, in configurations which are a little different from the invention in that they do not comprise two concentric channels and an intermediate space of notable width bordered by four concentric casings. Mention should also be made incidentally of document GB-A-2 004 329 which discloses guide vanes of different sizes, the largest being hollow, and which alternate by groups on a circumference of a gas channel without the presence of structural vanes.

However, the distance which must be kept between the vanes is such that the number of vanes is different for the two channels, with the result that it is necessary to provide not only supplementary guide vanes in the engine bypass air channel but also structural vanes in greater number than in the primary air channel in order to ensure that they are not too far apart. The structure of the invention meets this requirement.

In its most general definition, the invention thus relates to a gas turbine engine comprising a first, a second, a third and a fourth circular casing of decreasing and concentric diameters, the first and second casings forming the boundary of a bypass engine air channel and the third and fourth casings of a primary air channel, the bypass engine air channel being occupied by fixed gas guide vanes extending beyond neither the first nor second casings, and by the outer parts of fixed support vanes extending from the first to the fourth casing, the outer parts being prolonged by support arms between the third and fourth casings and by intermediate sleeves between the second and third casings, characterized in that the guide and support vanes alternate by groups on a single circumference and the intermediate sleeves are oblique and branched from the support arms to the outer parts of the support vanes.

There now follows a more detailed description of the invention, to be read in conjunction with the accompanying illustrative figures:

DETAILED DESCRIPTION OF THE DRAWINGS

Figure 1:
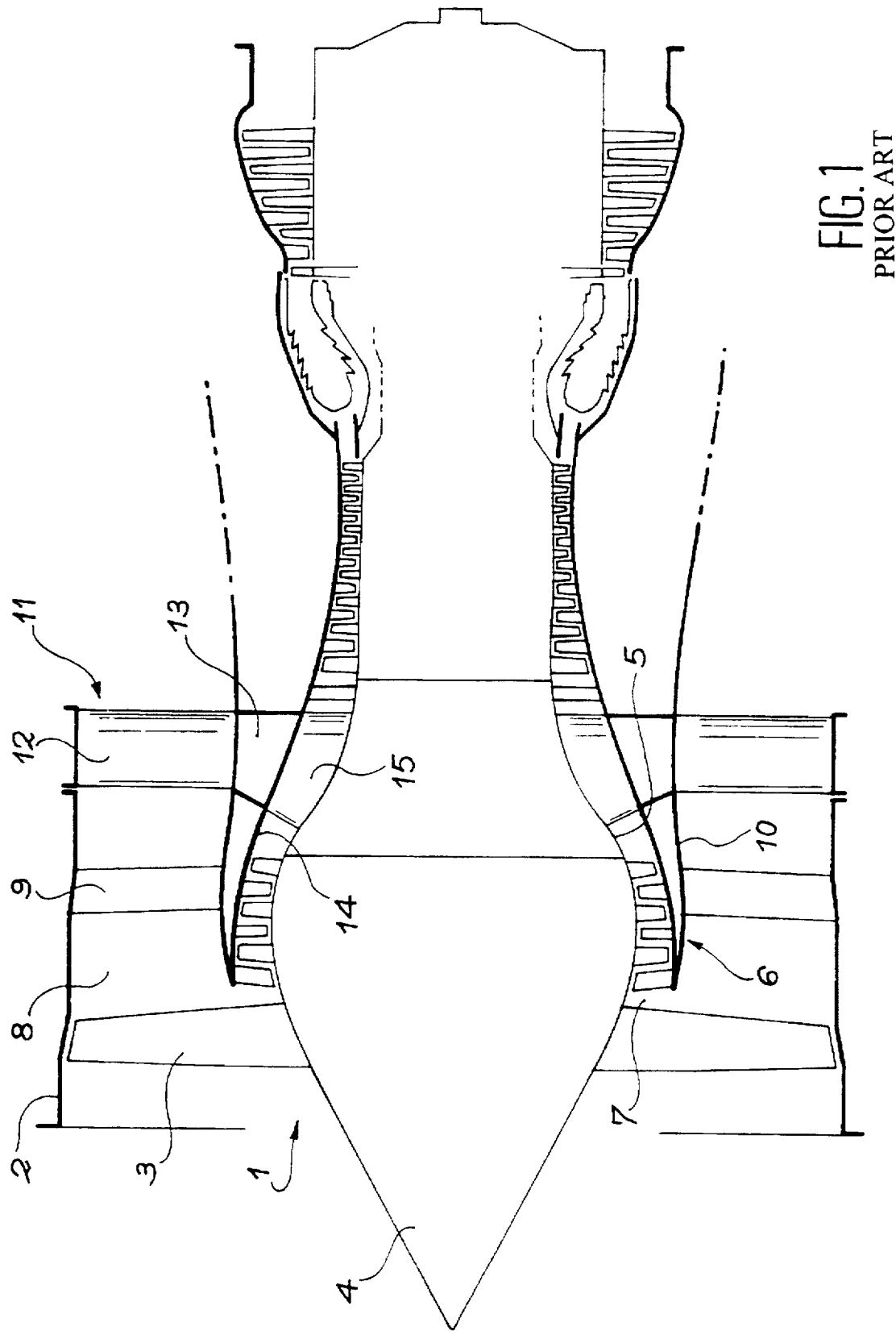
FIG. 1 represents a conventional engine.

In conformity with the notations provided in the text above, the engine in FIG. 1 comprises, at the front, a fan 1 fitted with fan cascade vanes 3 extending almost to an outer casing 2, from a central fuselage 4 which is prolonged by an inner stationary casing 5. An intermediate casing 6 appears between this stationary inner casing 5 and the outer casing 2 at the rear of the fan cascade vanes 3 in order to separate a primary air channel 7 from an engine bypass air channel 8 of the engine, the one encircling the other. Aerodynamic vanes 9 for guiding the gases extend between the outer casing 2 and an outer skin 10 of the intermediate casing 6, and structural vanes 11 designed to secure the cohesion of the assembly, which extend behind the aerodynamic vanes 9, may be considered as consisting of three parts: an outer part 12 lying between the outer casing 2 and the outer skin 10, in the engine bypass air channel 8, a median part 13 lying between the outer skin 10 and an inner skin 14 of the intermediate casing 6, and an inner part 15 extending between the inner part 14 and the inner casing 5, in the primary air channel 7.

Figure 2:
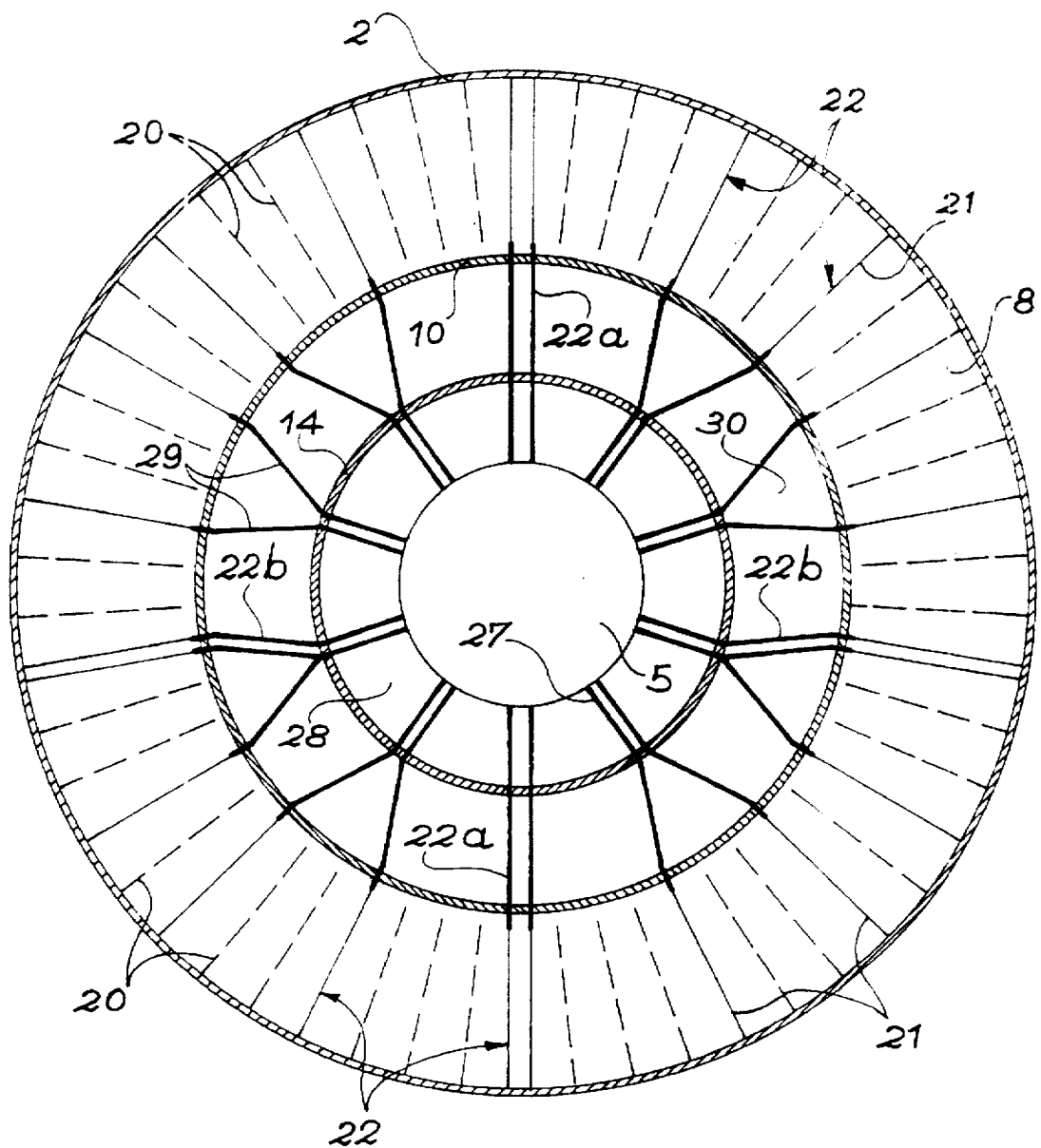
FIGS. 2 and 3 represent the arrangement of the invention.
Figure 3:
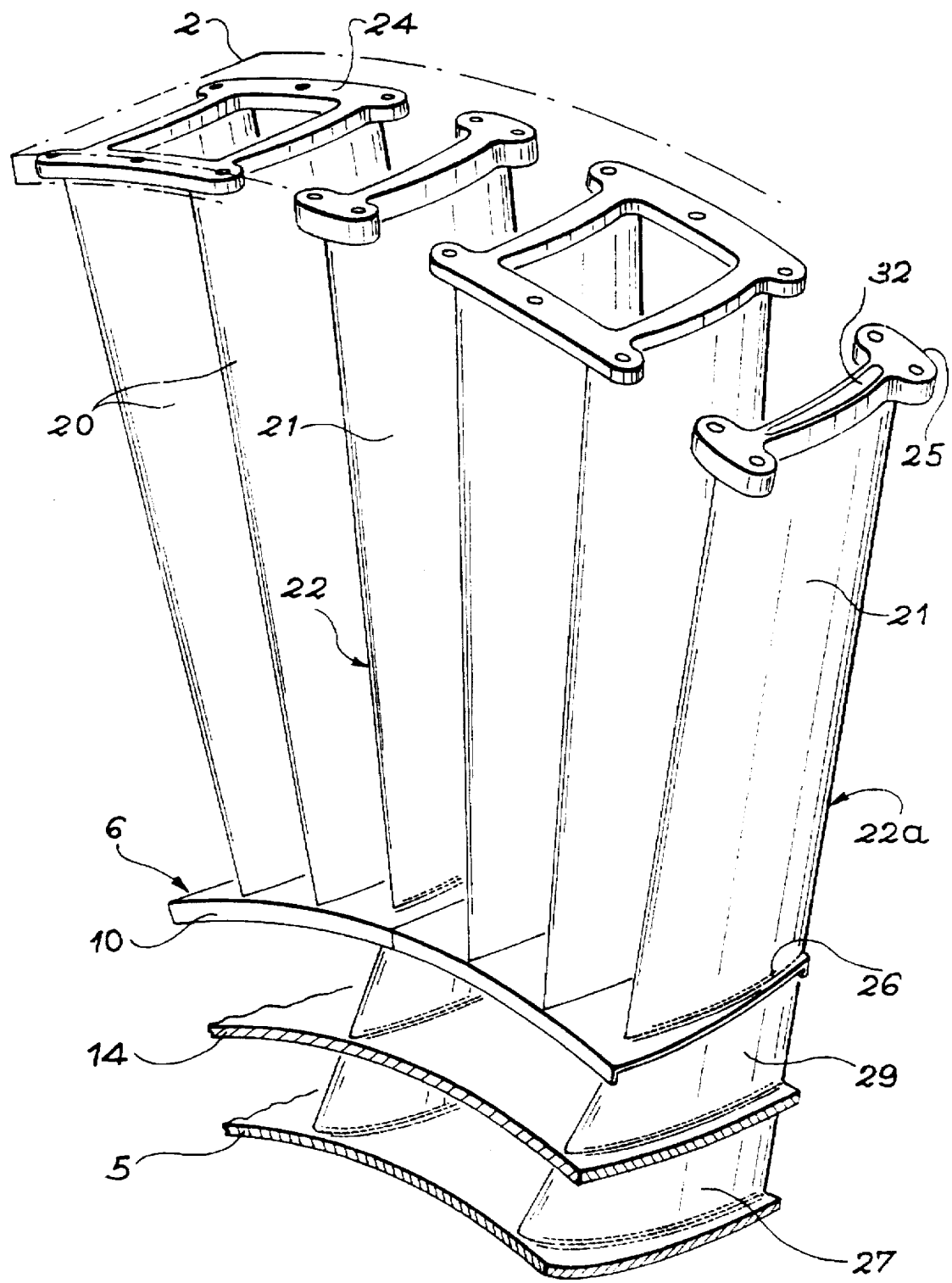

With the exception of the vanes, the same numerical references will be adopted in FIGS. 2 and 3 when speaking of the invention.

The aerodynamic vanes 20 and the outer parts 21 of the structural vanes 22 alternate on a same cross-section of the engine bypass air channel 8, and more specifically by groups, that is to say that between each outer part 21 of structural vane 22 one, two or three aerodynamic vanes 20 are located, depending on the casing, for reasons specifically related to the construction of the structural vanes 22 which will be addressed at a later stage.

It may be seen from FIG. 3 that the groups of aerodynamic vanes 20 are solidly attached to respective flanges 24 which are screwed onto the outer casing 2, also called retaining casing, and which is merely outlined in the figure. The whole may be constructed in a light material such as aluminum, or a composite material, or again titanium despite its cost. The aerodynamic vanes 20 are not linked to the intermediate casing 6 but are separated from it by means of a little play. Their cross-section is hollow in order to lighten their weight.

The external parts 21 of the structural vanes 22 are also provided with flanges 25 which are screwed to the outer casing 2, and extend as far as the outer skin 10 of the intermediate casing 6. They are advantageously constructed in titanium and may, as will be seen, be either solid or hollow.

It is not necessarily either useful or desirable for the inner parts 27 of the structural vanes 22, also called primary arms, to have an angular distribution identical to those of the exterior parts 21. This explains the decision, as represented in FIG. 2, to link the primary arms 27 to the respective outer parts by sleeves 29 which run obliquely across the internal volume of the intermediate casing 6, that is to say the space between the inner skin 14 and outer skin 10. In the situation represented, in which the outer parts 21, whose distance is approximately equal to the distance between the primary arms 27, are more numerous than said primary arms 27, the structural vanes 22 are for the most part split into two, that is to say that, in general, a pair of sleeves 29 corresponds to each primary arm 27, said sleeves coming together on said arm and extending on the other end in as many outer parts 21. In the construction represented, an exception is constituted by two diametrically opposed structural vanes, marked 22a; these structural vanes 22a are placed at the angular positions of twelve o'clock and six o'clock on the machine, and are rectilinear and entirely hollow (the hollow is marked 32 on FIG. 3) in order to receive rigid tubes or drive shafts enabling the outside of the machine to communicate, via the channels 7 and 8, with the usual equipment, such as oil pumps, electric motors, etc., situated in the center of the machine. An analogous arrangement of structural vanes may be retained for flexible tubes, but in this case it does not matter if the sleeves 29 are oblique; this possibility is chosen and represented on other structural vanes, two in number and marked 22b, and which may be chosen roughly perpendicular to the previously mentioned structural vanes 22a. These structural vanes 22b are split in two towards the exterior; one of the sleeves 29 and the outer part 21 in extension are hollow. The other structural vanes 22 are advantageously solid at their outer part 21 and this gives them an improved resistance to shocks. All the primary arms 27 may be hollow.

A weld 26 is formed in order to join the extremity of each of the outer parts 21 to the outer skin 10. The liaison may be carried out by bolting.

It will be observed that the structural vanes 22 of the invention may be three times less numerous than in the known solution, in which all the vanes are structural, whilst resisting the same stress. Thus, on average, two aerodynamic vanes 20 alternate with one structural vane 22, but irregular distributions are possible, notably because of the rectilinear vanes 22a whose shape is different.

We claim:

1. Arrangement of a gas turbine engine comprising:

a first, a second, a third and a fourth circular casing of decreasing and concentric diameters, the first casing and second casing forming the boundary of a bypass engine air channel and the third casing and fourth casing forming a primary air channel, the bypass engine air channel being occupied by fixed gas guide vanes outer parts of fixed support vanes extending from the first to the fourth casing, the outer parts being prolonged by support arms between the third and fourth casings and by intermediate sleeves between the second and third casings, the guide and support vanes alternate by groups on a single circumference and the intermediate sleeves are oblique and branched from the support arms to the outer parts of the support vanes.

2. Arrangement according to claim 1, wherein the guide vanes are constructed in a different material from that of the support vanes.

3. Arrangement according to one of claims 1 or 2, wherein the intermediate sleeves are hollow.

4. Arrangement according to claim 3, wherein at least some of the support vanes are hollow and form ducts.

5. Arrangement according to claim 4, wherein at least some of the ducts are straight.

6. Arrangement according to claim 5, wherein it comprises two diametrically opposed straight ducts, the structural vanes, with the exception of said two straight ducts, being split in two at the outer parts.

7. Arrangement according to claim 2, wherein the outer parts of the support vanes are mostly solid, and the guide vanes are hollow.

8. Arrangement according to claim 2, wherein the guide vanes are fixed to the first casing and detached from the second casing.

9. Arrangement according to claim 3, wherein the outer parts of the support vanes are mostly solid, and the guide vanes are hollow.

10. Arrangement according to claim 3, wherein the guide vanes are fixed to the first casing and detached from the second casing.

11. Arrangement according to claim 4, wherein the outer parts of the support vanes are mostly solid, and the guide vanes are hollow.

12. Arrangement according to claim 4, wherein the guide vanes are fixed to the first casing and detached from the second casing.

13. Arrangement according to claim 5, wherein the outer parts of the support vanes are mostly solid, and the guide vanes are hollow.

14. Arrangement according to claim 5, wherein the guide vanes are fixed to the first casing and detached from the second casing.

15. Arrangement according to claim 6, wherein the outer parts of the support vanes are mostly solid, and the guide vanes are hollow.

16. Arrangement according to claim 6, wherein the guide vanes are fixed to the first casing and detached from the second casing.

17. Arrangement according to claim 1, wherein the outer parts of the support vanes are mostly solid, and the guide vanes are hollow.

18. Arrangement according to claim 10, wherein the guide vanes are fixed to the first casing and detached from the second casing.

19. Arrangement according to claim 1, wherein the guide vanes are fixed to the first casing and detached from the second casing.

20. Arrangement according to claim 8, wherein the groups of guide vanes are interlocked by respective flanges screwed onto the first casing.

21. Arrangement according to claim 20, wherein the outer parts of the support vanes are interlocked by flanges screwed onto the first casing, and are welded to the second casing.

* * * * *

UNITED STATES PATENT AND TRADEMARK OFFICE
CERTIFICATE OF CORRECTION

PATENT NO. : 5,740,674
DATED : April 21, 1998
INVENTOR(S) : Bruno BEUTIN, et al.

It is certified that error appears in the above-identified patent and that said Letters Patent is hereby corrected as shown below:

On the title page item [73], Assignee's name is incorrect, it should read:

-- Societe Nationale d'Etude Et de Construction de Moteurs d'Aviation "SNECMA"--

Signed and Sealed this

Twenty-second Day of September, 1998

Attest:

BRUCE LEHMAN

Attesting Officer　　　Commissioner of Patents and Trademarks